(12) United States Patent
Chang et al.

(10) Patent No.: US 10,652,974 B2
(45) Date of Patent: May 12, 2020

(54) FIBER OPTIC TWINKLING STAR PATTERNS BY MEANS OF LIGHT ENGINE AND SPECIALIZED OPTICS

(71) Applicant: The Boeing Company, Chicago, IL (US)

(72) Inventors: Kevin Julian Chang, Seattle, WA (US); John Christiaan Beckman, Everett, WA (US); Christopher Michael Cipolla, Everett, WA (US); David D. Chen, Everett, WA (US); Diana Elizabeth Bonilla, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/147,421

(22) Filed: Sep. 28, 2018

(65) Prior Publication Data

US 2020/0029406 A1 Jan. 23, 2020

Related U.S. Application Data

(60) Provisional application No. 62/701,431, filed on Jul. 20, 2018.

(51) Int. Cl.
*F21V 21/00* (2006.01)
*H05B 37/02* (2006.01)
(Continued)

(52) U.S. Cl.
CPC ........... *H05B 37/029* (2013.01); *B64D 47/04* (2013.01); *F21V 5/043* (2013.01); *G02B 6/0008* (2013.01);
(Continued)

(58) Field of Classification Search
CPC .. H05B 37/029; B64D 47/04; B64D 2203/00; F21V 5/043; F21V 220/13; G02B 6/0008; F21W 2121/008
(Continued)

(56) References Cited

U.S. PATENT DOCUMENTS 4,917,448 A * 4/1990 Oppenheimer ...... G02B 6/3644
362/554
5,101,466 A 3/1992 Reidinger
(Continued)

FOREIGN PATENT DOCUMENTS

GB 2143665 2/1985
KR 2011/0129590 12/2011

*Primary Examiner* — Laura K Tso
(74) *Attorney, Agent, or Firm* — Haynes and Boone LLP (57) ABSTRACT

Systems, methods, and apparatus for fiber optic lighting panels that produce twinkling star patterns by means of a light engine and specialized optics are disclosed. In one or more embodiments, a disclosed panel for creating a lighted scene comprises a substrate comprising a first surface, a second surface spaced from the first surface, and a plurality of apertures through the first and second surfaces. The panel further comprises an optical lens disposed on the first surface within each of the apertures. Also, the panel comprises a light distribution unit (LDU) comprising a plurality of light sources coupled to the second surface. Further, the panel comprises a bundle of optical fibers coupled to each of the light sources, where each of the optical fibers is in communication with one of the optical lenses for transferring light emitted by the light sources to create the lighted scene.

20 Claims, 10 Drawing Sheets

(51) Int. Cl.
  *B64D 47/04* (2006.01)
  *F21V 8/00* (2006.01)
  *F21V 5/04* (2006.01)
  *F21W 121/00* (2006.01)

(52) U.S. Cl.
  CPC ...... *B64D 2203/00* (2013.01); *F21V 2200/13* (2015.01); *F21W 2121/008* (2013.01)

(58) Field of Classification Search
  USPC ....... 362/559, 554, 555, 558, 565, 576, 470, 362/471, 121
  See application file for complete search history.

(56) References Cited

U.S. PATENT DOCUMENTS

| | | | | |
|---|---|---|---|---|
| 5,184,253 A * | 2/1993 | Hwang | ................... | G02B 6/06 359/385 |
| 5,986,792 A | 11/1999 | Rizkin et al. | | |
| 6,106,140 A * | 8/2000 | Krummer | ................ | B64D 9/00 362/471 |
| 6,195,016 B1 | 2/2001 | Shankle et al. | | |
| 6,198,872 B1 * | 3/2001 | Lipson | ................... | G02B 6/25 362/555 |
| 6,234,657 B1 * | 5/2001 | Shih | ................... | G02B 6/0008 362/554 |
| 7,018,084 B2 * | 3/2006 | Gotfried | .............. | G02B 6/0006 362/153 |
| 7,686,491 B1 * | 3/2010 | Isaacson | ................... | A63J 5/02 362/552 |
| 7,857,484 B2 | 12/2010 | Marshall et al. | | |
| 8,033,684 B2 * | 10/2011 | Marshall | ................... | F21K 9/00 362/249.02 |
| 9,731,824 B2 * | 8/2017 | Madhav | ................ | G03B 31/00 |
| 2004/0057251 A1 * | 3/2004 | Isaacson | ................... | A63J 5/02 362/555 |
| 2004/0250457 A1 | 12/2004 | Strein et al. | | |
| 2009/0059609 A1 | 3/2009 | Marshall et al. | | |
| 2010/0141572 A1 * | 6/2010 | Kamada | ................ | G02B 6/0008 345/102 |
| 2015/0008282 A1 * | 1/2015 | Boomgaarden | .... | B64D 11/0015 244/118.5 |
| 2017/0136944 A1 | 5/2017 | Duce et al. | | |
| 2017/0142523 A1 | 5/2017 | Schalla et al. | | |
| 2017/3332148 | 11/2017 | Fullerton et al. | | |

* cited by examiner

FIBER OPTIC TWINKLING STAR PATTERNS BY MEANS OF LIGHT ENGINE AND SPECIALIZED OPTICS

CROSS-REFERENCE TO RELATED APPLICATION

This application claims priority to and the benefit of U.S. Provisional Patent Application No. 62/701,431, filed on Jul. 20, 2018, the entire disclosure of which is expressly incorporated by reference herein.

FIELD

The present disclosure relates to lighting panels. In particular, it relates to fiber optic lighting panels that produce twinkling star patterns by means of a light engine and specialized optics.

BACKGROUND

Passenger aircraft that operate over long distances during the night typically include interior lighting arrangements that provide substantially reduced ambient light so that passengers can sleep comfortably, but which is still bright enough to enable those passengers who choose not to sleep to move about the cabin safely. For example, currently, some models of the Boeing 777 passenger jet incorporate ceiling panels that incorporate light emitting diodes (LEDs) that are arranged to blink in random patterns against a dark background, which in an ambient light condition, gives a relaxing, soporific appearance of a starry nighttime sky, and hence, is referred to as a "starry sky" ceiling lighting arrangement.

These existing solutions for a starry skies ceiling feature (e.g., a starry skies ceiling panel) employ individual LEDs for each of the many stars in the panel. The manufacture of each of these panels is performed manually by drilling holes in the panel for the LEDs, inserting the LEDs into the drilled holes in the panel, and manually routing the wires that are attached to the LEDs along the back of the panel. This procedure is very labor intensive. As such, these designs require long lead times in manufacturing, and may cause repetitive motion injuries to the LED installers of these panels.

Control of these wired panels is performed by a star light controller (SLC), which is a one channel controller. To achieve multiple different channel effects on the panel (e.g., to produce various different cabin mood lighting), several SLCs are required on each panel. Each SLC draws approximately 3500 Watts (W) and weighs about one or two pounds. Since each panel requires multiple SLCs, these panels consume a lot of power and are very heavy.

These existing designs utilize LEDs flush to the surface of the panel to create the visible "stars". These designs do not employ any additional optics or lenses other than the LEDs themselves, so the distribution of the light illuminated from each of the LEDs is poor (e.g., each of the LEDs illuminates a very narrow beam of light) and, as such, the "stars" do not appear very realistic. In addition, the LEDs on these panels are controlled manually by the flight attendant during flight, which requires time and energy from the flight attendant to manage the functionality of the LEDs throughout the different phases of flight.

In light of the foregoing, there is a need for in improved starry skies ceiling feature that is simpler to manufacture, low power, lightweight, appears realistic, and easier to control.

SUMMARY

The present disclosure relates to a method, system, and apparatus for fiber optic lighting panels that produce twinkling star patterns by means of a light engine and specialized optics. In one or more embodiments, a panel for creating a lighted scene comprises a substrate comprising a first surface, a second surface spaced from the first surface, and a plurality of apertures through the first and second surfaces. The panel further comprises an optical lens disposed on the first surface within each of the apertures. Also, the panel comprises a light distribution unit (LDU) comprising a plurality of light sources coupled to the second surface. Further, the panel comprises a bundle of optical fibers coupled to each of the light sources, where each of the optical fibers is in communication with one of the optical lenses for transferring light emitted by the light sources to create the lighted scene.

In one or more embodiments, the substrate is configured to be mounted to an interior of a vehicle. In some embodiments, the vehicle is an airborne vehicle (e.g., an aircraft or space plane), a terrestrial vehicle (e.g., a truck, bus, or train), or a marine vehicle (e.g., a boat or submarine).

In at least one embodiment, each of the optical lenses is convex in shape. In some embodiments, each of the optical lenses allows for light to be observed from up to a ninety (90) degree viewing angle.

In one or more embodiments, the light sources are light emitting diodes (LEDs) with multiple different color wavelengths. In at least one embodiment, each of the light sources illuminates a different illumination pattern. In some embodiments, one of the illumination patterns is a slow twinkling illumination pattern, a fast twinkling illumination pattern, a constant bright illumination pattern, or a constant dim illumination pattern.

In at least one embodiment, the bundle of optical fibers is coupled to each of the light sources via a light pipe. In some embodiments, each of the light sources is individually controllable.

In one or more embodiments, a method for operating a panel for creating a lighted scene comprises commanding, by a light distribution unit (LDU) of the panel, at least one light source within the LDU to illuminate according to a current operational phase. The method further comprises illuminating light, by at least one light source, according to the current operational phase, where the light is illuminated through optical fibers coupled to the at least one light source to create the lighted scene.

In at least one embodiment, the method further comprises processing, by a cabin services system (CSS), operational data to determine the current operational phase. In some embodiments, the operational data is flight data.

In one or more embodiments, the method further comprises commanding, by a CSS, a star light controller (SLC) to control the LDU of the panel according to the current operational phase. In some embodiments, the current operational phase is a current flight phase.

In at least one embodiment, the method further comprises mounting the panel within an interior of a vehicle. In some embodiments, the vehicle is an airborne vehicle, a terrestrial vehicle, or a marine vehicle.

In one or more embodiments, at least one light source is a light emitting diode (LED). In at least one embodiment, at least one light source illuminates an illumination pattern. In some embodiments, the illumination pattern is a slow twinkling illumination pattern, a fast twinkling illumination pattern, a constant bright illumination pattern, or a constant dim illumination pattern.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for fiber optic lighting panels that produce twinkling star patterns by means of a light engine and specialized optics. In one or more embodiments, the system of the present disclosure utilizes fiber optics to generate a starry skies ceiling feature (e.g., a ceiling panel comprising twinkling star patterns). The disclosed starry skies ceiling feature is created by utilizing optical fibers instead of wires, creating new light engines, employing lenses for optics, and enhancing the control of the feature such that the starry skies ceiling feature will generate different cabin mood lighting for the different phases of flight. In particular, in one or more embodiments, the disclosed starry skies ceiling feature (e.g., starry skies ceiling panel) comprises a light distribution unit (LDU), which includes multiple individually controlled LED light sources, and comprises a plurality of optical fibers coupled to the LDU for transferring emitted light throughout the panel.

As previously mentioned above, currently, existing solutions for the starry skies ceiling feature (e.g., the starry skies ceiling panel) employ individual LEDs for each "star" in the panel. These panels are difficult to manufacture, typically have long lead times, and require the technician to endure repetitive motions to install the many small LEDs throughout the panel.

The design of the disclosed starry skies ceiling panel reduces the number of LEDs required, and eliminates much of the associated wiring. The use of fiber optics and use of an LDU to drive the optical fibers in the disclosed starry skies ceiling feature greatly lessens the weight and power consumption of the ceiling panels. In addition, the fiber optics design allows for efficient installation and eliminates repetitive motion injuries that may occur from installing the individual LEDs used in the existing solutions.

The lenses used for the optics in the disclosed starry skies ceiling panel creates the luminous perception of each of the stars illuminating brighter across a greater degree of viewing area and, therefore, makes the stars appear more realistic. In addition, the control of the starry skies ceiling feature by means of the different phases of flight (i.e. the starry skies ceiling feature is controlled to be brighter for a daytime flight phase than for a nighttime flight phase) saves time and energy for the flight attendants so that they do not need to manually switch on and off the different stars of the starry skies ceiling feature during the different phases of flight.

The fiber optics design for the panel may be in a unique pattern to emulate stars in the sky, or to specifically emulate a particular part of the night sky (i.e. to emulate particular constellations). The use of fiber optics allows for multiple channels to be utilized to generate an aesthetically realistic star pattern or constellation.

The use of the fiber optics, compared to traditional electrical wiring which is used by the current solutions, greatly decreases the weight and power consumption of each individual panel. The use of a LDU, which in some embodiments comprises four channels, decreases the weight on each individual panel and greatly reduces power consumption. Currently used conventional solutions employ multiple SLCs on each panel, where each SLC consumes 3500 W in order to drive approximately 60 to 90 LEDs installed on the panel. For the design of the disclosed system, only one LDU is needed on each panel, and a single LDU only consumes 4 W. In the disclosed system, the entire shipset (e.g., vehicle) worth of starry skies ceiling panels are driven by one SLC. These design features provide a large savings in weight and in power consumption.

A single LDU is capable of employing four LEDs of different wavelengths, where one LED may be a warm 2500 Kelvin (K) Correlated Color Temperature (CCT) LED, a second LED may be a neutral 4000K CCT LED, a third LED may be a cool 5500K CCT LED, and a fourth LED may be a cold 6500K CCT LED. This combination of four different types of LEDs closely simulates the star color differences that are physically observed in the nighttime sky. The four channels (from the four different LEDs) produce four states, which are: a dim state (constant dim), a bright state (constant bright), a twinkle slow state (slow twinkling), and a twinkle fast state (fast twinkling). The combined four different LEDs with their respective channels creates a closely accurate realistic representation of stars being closer or further away in the night sky and of the stars exhibiting different color intensities.

The optical lenses employed by the disclosed system allow for a higher luminous perception at zero (0) degrees beneath the star panels and up to eighty-five (85) degrees of observation away from the star panel. This allows passengers to enjoy the star features of a single panel even when being located many rows away from that particular panel. In one or more embodiments, the employed lens has a tip that allows for this distribution of light.

The mood lighting control of the starry skies panels allows for the flight attendants to not have to manually manage the star panels on/off function during the different phases of flight. For example, at the beginning of a sleep phase during flight, communication triggers from the airplane cabin services system (CSS) will automatically trigger the starry skies ceiling panels to set their various four channel states appropriately to display a nighttime sky sleep scene. As such, this design allows for the time and energy that would be normally used by the flight attendants to manage the starry skies panels to be used for the needs of the passengers instead.

In one or more embodiments, the disclosed starry skies ceiling feature is directed to a system for enhancing passenger experience during flight. More specifically, the system provides a twinkling star pattern on the ceiling of an aircraft. The disclosed system comprises a panel configured to be installed in the upper section of the passenger area of an aircraft. The panel comprises a substrate having a first and second surface spaced from one another, and defines a plurality of apertures through the surfaces. The apertures are randomly positioned throughout the panel. Optical lenses presenting a convex surface are disposed in each of the apertures, on the first surface within the passenger area.

An LDU including multiple LEDs is disposed on a second surface of the panel, which is concealed from view within the passenger area of the aircraft. Each of the LEDs emits a different illumination pattern (e.g., slow twinkling, fast twinkling, constant bright, constant dim). A light pipe is coupled to each LED for directing the light emitted therefrom. A bundle of optical fibers is coupled to each light pipe, and optical lenses are coupled to the optical fibers for directing light from the light source and through the optical lenses. The optical lenses are convex in shape to allow for light to carry through and illuminate out of the lens tip. Each of the LEDs can be individually controlled for customizing the lighting scene (e.g., for customizing cabin mood lighting). The fiber optic cables are configured in a substantially random pattern along the substrate for mixing the various illumination patterns to create a realistic starry pattern within the passenger area of the vehicle.

It should be noted that while the various exemplary lighting panel embodiments disclosed herein are described and illustrated in the context of aircraft interior ceiling lighting systems, it will be evident that they are not limited to this particular application, but may be used in a variety of other applications (e.g., other aircraft surfaces, such as entry area ceilings; other vehicles, such as cars, trains, buses, or boats; destination spaces, such as airports, train stations, or subway stations; or even non-vehicle applications, such as dance halls, shopping malls, theaters, residential ceilings, and the like).

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to lighting panels, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

Figure 1:
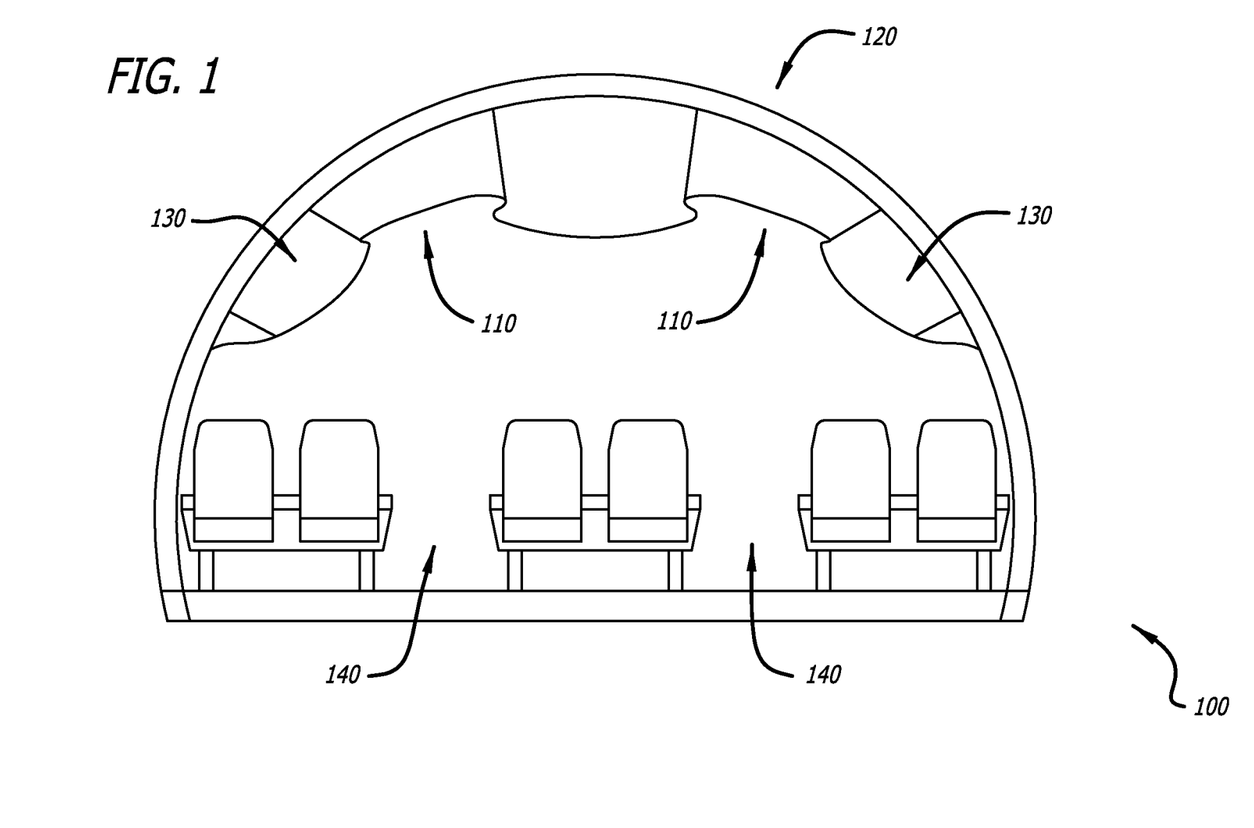
FIG. 1 is a diagram showing a cross-sectional view of an exemplary vehicle that employs the disclosed starry skies ceiling panel, in accordance with at least one embodiment of the present disclosure.

FIG. 1 is a diagram 100 showing a cross-sectional view of an exemplary vehicle (e.g., aircraft) 120 that employs the disclosed starry skies ceiling panel 110, in accordance with at least one embodiment of the present disclosure. In this figure, the vehicle 120 depicted as an aircraft. However, it should be noted that in other embodiments, the disclosed panel 110 may be employed by various different types of vehicles 120 other than an aircraft including, but not limited to, other type of airborne vehicles (e.g., a space plane), terrestrial vehicles (e.g., trucks, buses, and trains), and marine vehicles (e.g., boats or submarines). In addition, in some embodiments, the disclosed panel 110 may be employed for non-vehicle applications including, but not limited to, dance halls, shopping malls, theaters, or residential ceilings.

In this figure, two starry skies ceiling panels 110 are shown to be installed within the interior of the vehicle (e.g., aircraft) 120. In particular, the panels 110 are installed on the ceiling of the vehicle 120 just above the luggage storage areas 130 and above the aisles 140 of the vehicle 120. It should be noted that in other embodiments, the panels 110 may be installed in various different locations of the vehicle 120 other than the locations as shown in FIG. 1.

Figure 2:
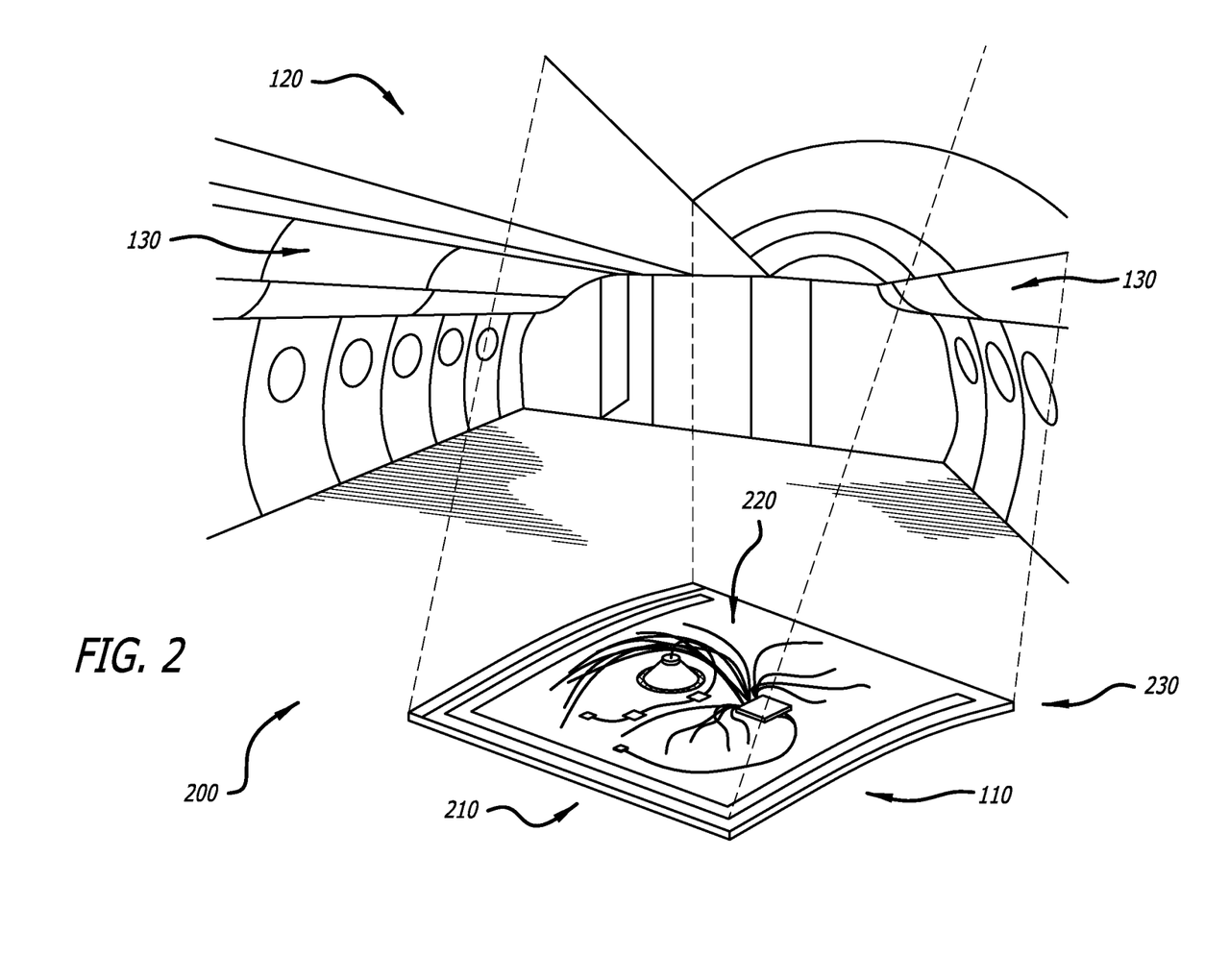
FIG. 2 is a diagram showing how the disclosed starry skies ceiling panel is mounted within the exemplary vehicle of FIG. 1, in accordance with at least one embodiment of the present disclosure.

FIG. 2 is a diagram 200 showing how the disclosed starry skies ceiling panel 110 is mounted within the exemplary vehicle 120 of FIG. 1, in accordance with at least one embodiment of the present disclosure. In particular, this figure shows an exploded view of the panel 110 being pulled off of its mounting location on the ceiling of the interior of the vehicle 120. The panel 110 comprises a substrate 230, which comprises a first surface 210 that can be viewed from the interior of the vehicle 120 when the panel is mounted within the vehicle 120, and a second surface 220 that cannot be viewed from the interior of the vehicle 120 when the panel is mounted within the vehicle 120. This exploded view shows the details of the second surface 220 of the panel 110.

Figure 3:
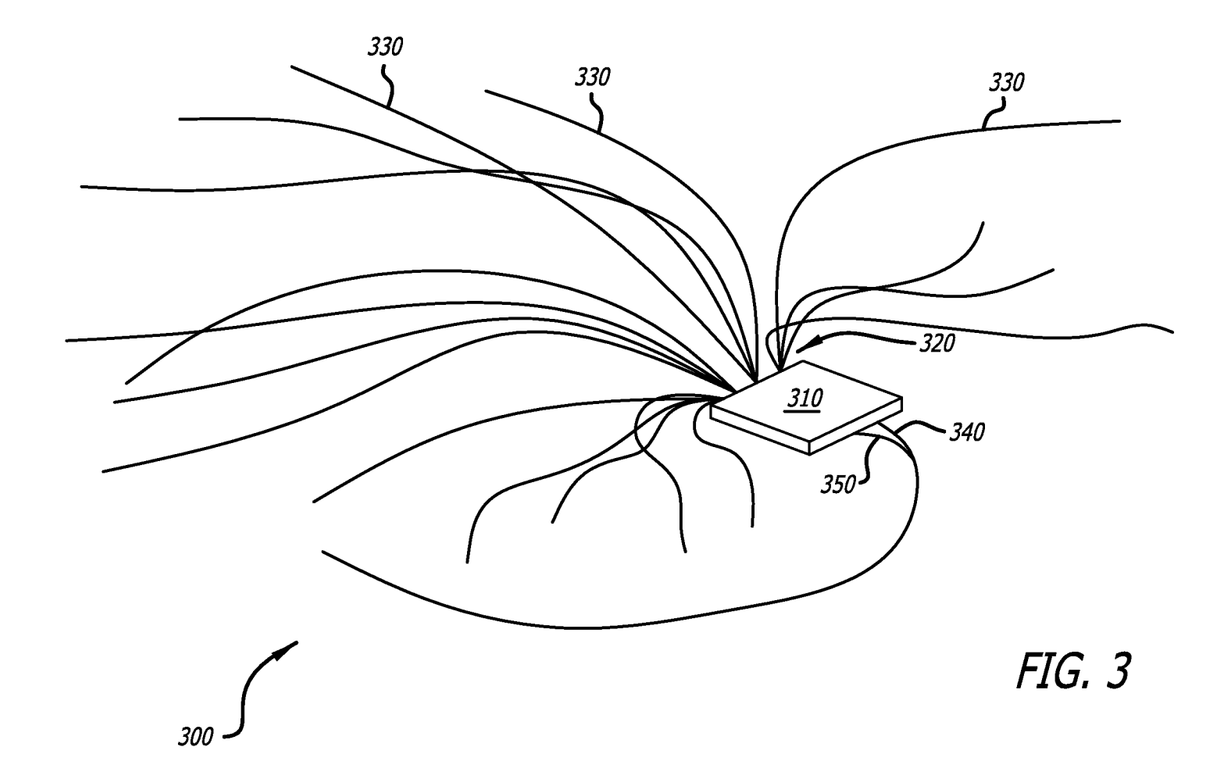
FIG. 3 is a diagram showing details of components of the disclosed starry skies ceiling panel, in accordance with at least one embodiment of the present disclosure.

FIG. 3 is a diagram 300 showing details of components of the disclosed starry skies ceiling panel 110, in accordance with at least one embodiment of the present disclosure. In this figure, the components include a light distribution unit (LDU) 310, a power line 340 connected to the LDU 310 to deliver power the LDU 310, and a communications wire 350 connected to the LDU 310 to deliver control commands to the LDU 310. In addition, four bundles 320 of optical fibers 330 are shown to be coupled to the LDU 310. The loose ends of each of the optical fibers 330 illuminate light that creates a lighted scene on the panel 110.

Figure 4:
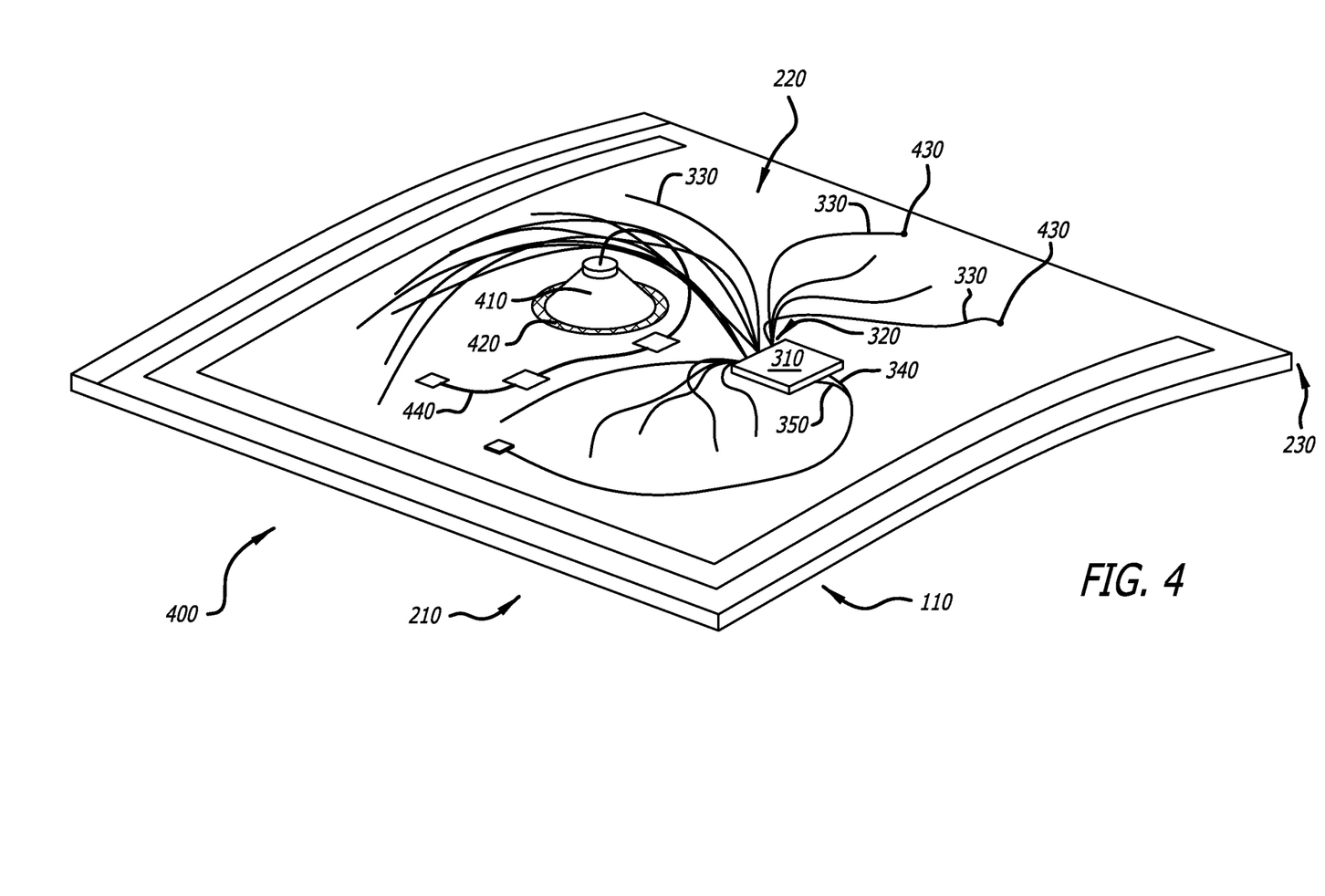
FIG. 4 is a diagram showing details how the components of the disclosed starry skies ceiling panel are arranged on the panel, in accordance with at least one embodiment of the present disclosure.

FIG. 4 is a diagram 400 showing details how the components of the disclosed starry skies ceiling panel 110 are arranged on the panel 110, in accordance with at least one embodiment of the present disclosure. In this figure, a bottom surface of the LDU 310 is coupled (e.g., mounted) to the second surface 220 of the panel 110. An optical device (refer to 620 of FIG. 6) comprising an optical lens (refer to 610 of FIG. 6) is coupled to the loose end of each optical fiber 330. The substrate 230 of the panel 110 comprises a plurality of apertures 430 (also refer to 430 of FIG. 6) through the first surface 210 and the second surface 220. The optical lenses (refer to 610 of FIG. 6) coupled to the loose ends of the optical fiber 330 are disposed within the first surface 210 the apertures 430. The optical fibers 330 are configured in a substantially random pattern in the apertures 430 of the substrate 230 of the panel 110 for mixing various illumination patterns to create a realistic starry pattern within the passenger area of the vehicle 120.

In addition, the substrate 230 of the panel 110 comprises a large aperture 420 for a speaker 410. The large aperture 420 is covered with a light material (e.g., a fabric) to cover the aperture 420 and to also allow for sound waves emitted from the speaker 410 to radiate through the aperture 420 to the first side 210 of the panel 110. Also, a power line 440 is connected to the speaker 410 to deliver power the speaker 410.

Figure 5:
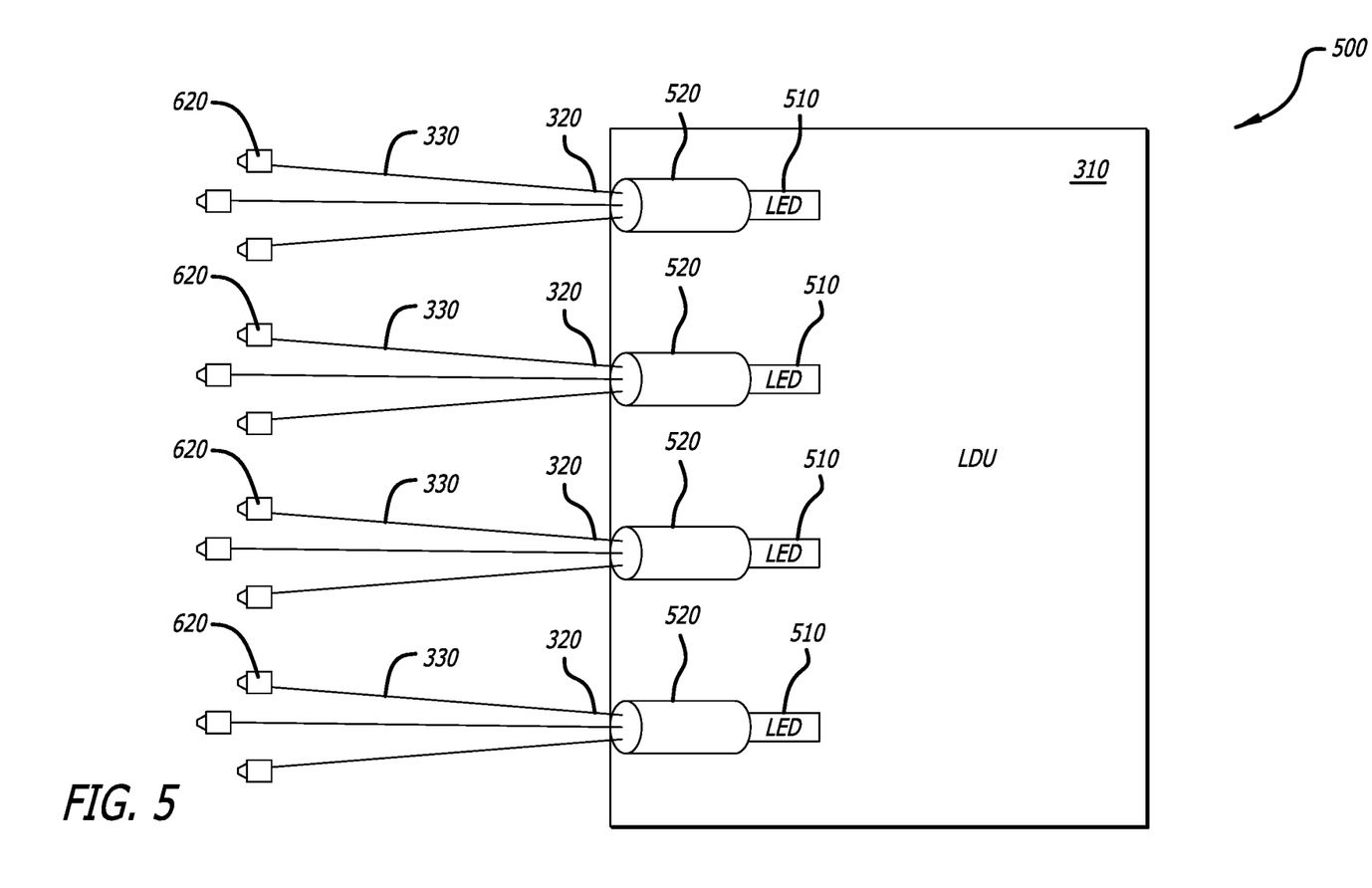
FIG. 5 is a diagram showing details of the light distribution unit (LDU) of the disclosed starry skies ceiling panel, in accordance with at least one embodiment of the present disclosure.

FIG. 5 is a diagram 500 showing details of the light distribution unit (LDU) 310 of the disclosed starry skies ceiling panel 110, in accordance with at least one embodiment of the present disclosure. In this figure, the LDU 310 is shown to comprise four light sources 510. The light sources 510 are light emitting diodes (LEDs) with multiple different color wavelengths. It should be noted that, in one or more embodiments, the LDU 310 may comprise more or less light sources 510 than four light sources 510 as is shown in FIG. 5. In addition, it should be noted that other types of lighting devices other than LEDs may be employed for the light sources 510 of the LDU 310.

Each of the light sources 510 can be individually controlled by the LDU 310 for customizing the lighting scene (e.g., for customizing cabin mood lighting). Also, each light source 510 may illuminate a different illumination pattern, such as a slow twinkling illumination pattern, a fast twinkling illumination pattern, a constant bright illumination pattern, and/or a constant dim illumination pattern. For example, one light source 510 (channel 1) may employ a warm 2500 Kelvin (K) Correlated Color Temperature (CCT) LED to illuminate a slow twinkling illumination pattern, second light source 510 (channel 2) may employ a cold 10,000K CCT LED to illuminate a constant bright illumination pattern, a third light source 510 (channel 3) may employ a cool 5500K CCT LED to illuminate a fast twinkling illumination pattern, and a fourth light source 510 (channel 4) may employ a neutral 3500K CCT LED to illuminate a constant dim illumination pattern. In order to generate different lighting scenes on the panel 110, different light sources 510 may be activated (e.g., illuminated) or inactivated (e.g., not illuminated). For example, to generate a nighttime sky scene on the panel 110, only the channel 1 and channel 4 may be activated to illuminate a slow twinkling illumination pattern and a constant dim illumination pattern, respectively. And, for example, to generate a daytime sky scene on the panel, only channel 2 and channel 3 may be activated to illuminate a constant bright illumination pattern and a fast twinkling illumination pattern, respectively.

Also in this figure, the LDU 310 is shown to comprises light pipes (e.g., a lightguide) 520. A light pipe 520 is coupled to each light source 510 for directing the light emitted therefrom. A bundle of optical fibers 320 is coupled to each light pipe 520, and optical devices 620 (also refer to FIG. 6) are coupled to the optical fibers 330 for directing light from the light source 510 and through the optical lenses (refer to 610 of FIG. 6) of the optical devices 620.

Figure 6:
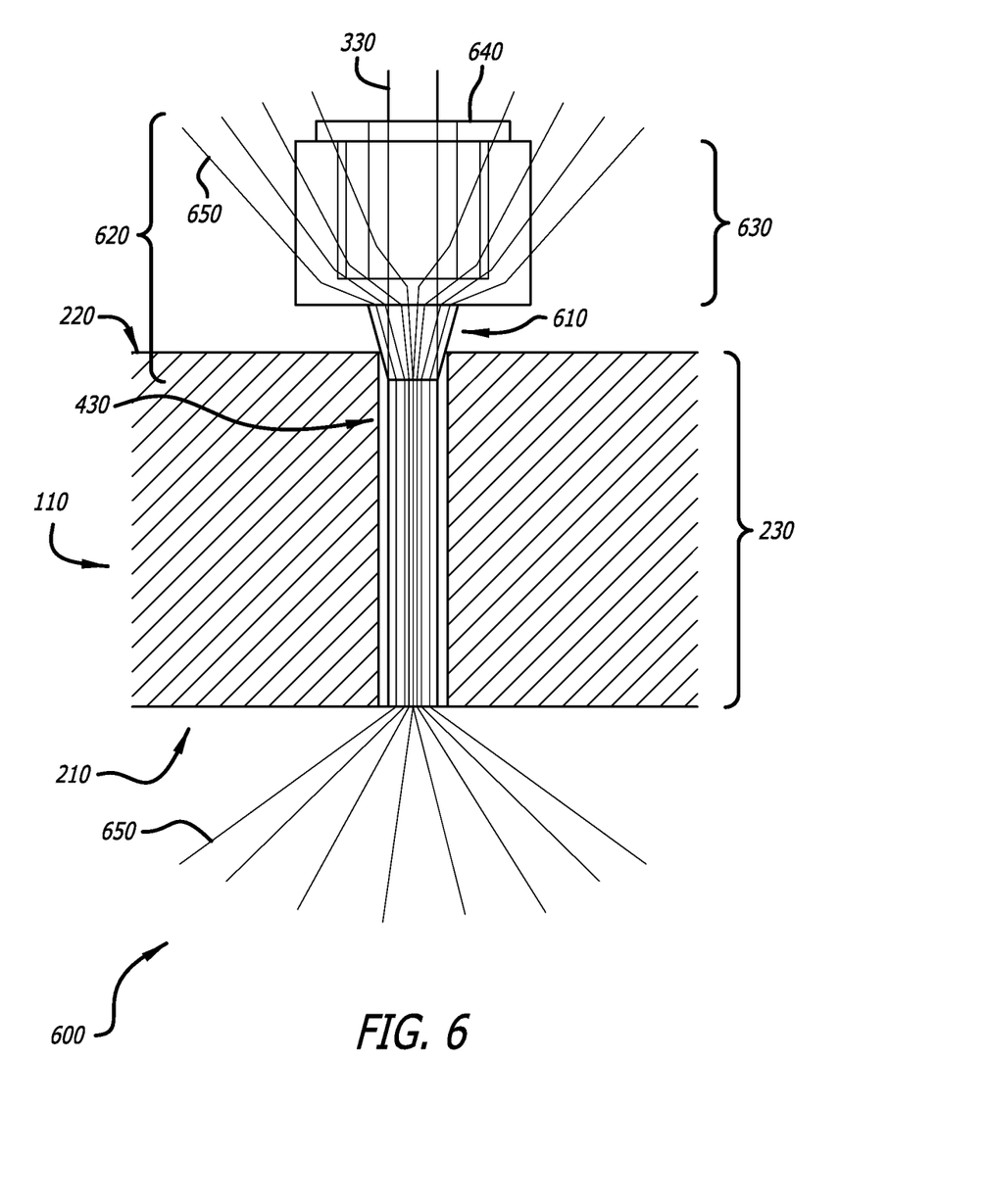
FIG. 6 is a diagram showing details of how each optical lens is disposed within the disclosed starry skies ceiling panel, in accordance with at least one embodiment of the present disclosure.

FIG. 6 is a diagram 600 showing details of how each optical lens 610 is disposed within the disclosed starry skies ceiling panel 110, in accordance with at least one embodiment of the present disclosure. In this figure, an optical device 620 is coupled to the end of an optical fiber 330. The optical device 620 comprises a bushing 640, an optical insert 630, and an optical lens 610. As such, an optical lens 610 is coupled to the end of the optical fiber 330 via the optical device 620. It should be noted that in other embodiments, different types of optical devices other than the optical device 620 as shown in FIG. 6 may be employed for the optical device 620 of the disclosed panel 110.

The substrate 230 of the panel 110 comprises an aperture 430 through the first surface 210 and the second surface 220. The optical lens 610 coupled to the end of the optical fiber 330 is disposed within the first surface 210 the aperture 430. The optical device 620 coupled to the optical fiber 330 directs light 650 from the light source (refer to 510 of FIG. 5) and through the optical lens 610. The optical lens 610 is convex in shape to allow for light 650 to be observed from up to a ninety (90) degree viewing angle on the second side of the substrate 230.

Figure 7:
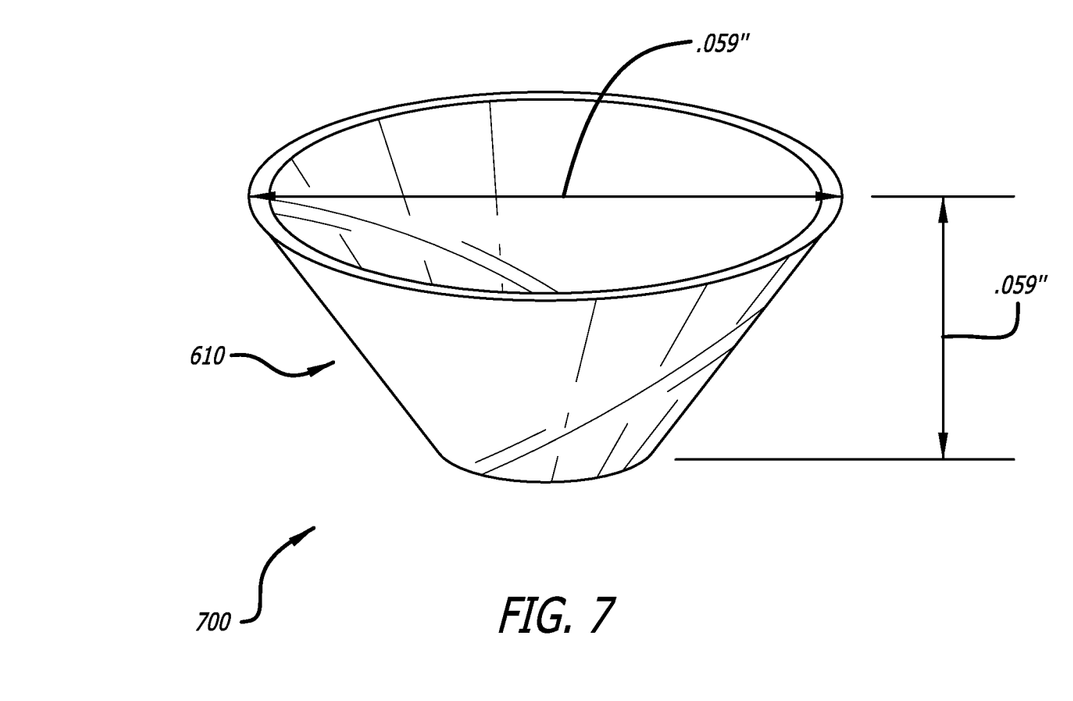
FIG. 7 is a diagram showing details of an exemplary optical lens that may be employed for each of the optical lenses of disclosed starry skies ceiling panel, in accordance with at least one embodiment of the present disclosure.

FIG. 7 is a diagram 700 showing details of an exemplary optical lens 610 that may be employed for each of the optical lenses 610 of disclosed starry skies ceiling panel 110, in accordance with at least one embodiment of the present disclosure. In this figure, the exemplary lens 610 is shown to be convex in shape. It should be noted that in other embodiments, the optical lens 610 may be of a different shape than convex in shape as is shown in FIG. 7.

Figure 8:
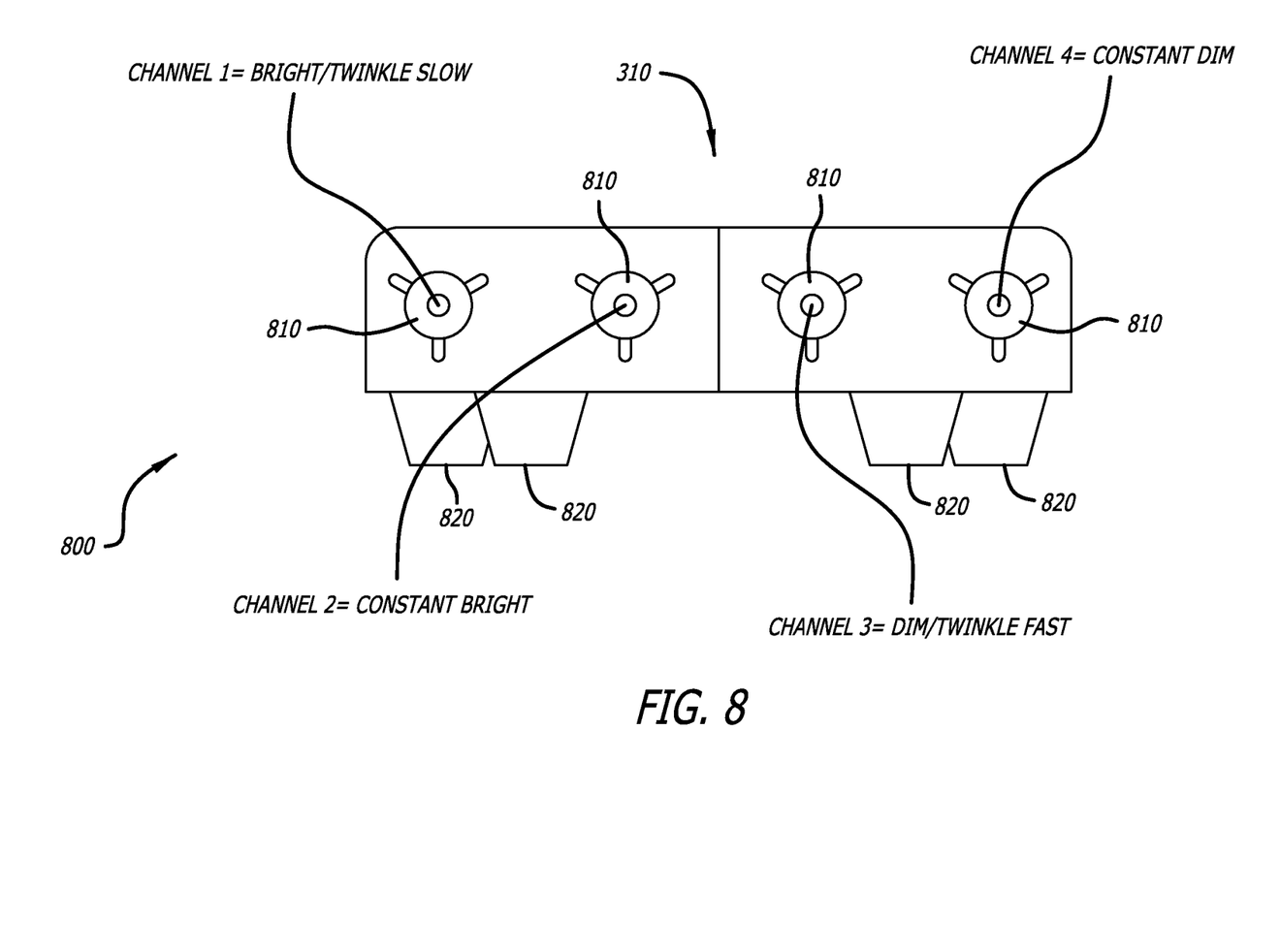
FIG. 8 is a diagram showing the side view of the LDU of the disclosed starry skies ceiling panel, in accordance with at least one embodiment of the present disclosure.

FIG. 8 is a diagram 800 showing the side view of the LDU 310 of the disclosed starry skies ceiling panel 110, in accordance with at least one embodiment of the present disclosure. In this figure, ports 810 for the optical fibers (refer to 330 of FIG. 5) are shown to be located on the side of the LDU 310. Bundles of optical fibers (refer to 320 of FIG. 5) are coupled to the LDU 310 via the ports 810. In addition, the LDU 310 is shown to comprise several mounting feet 820, which may be used to couple (e.g., to mount) the LDU 310 to the second side 220 of the substrate 230 of the panel 110.

Figure 9:
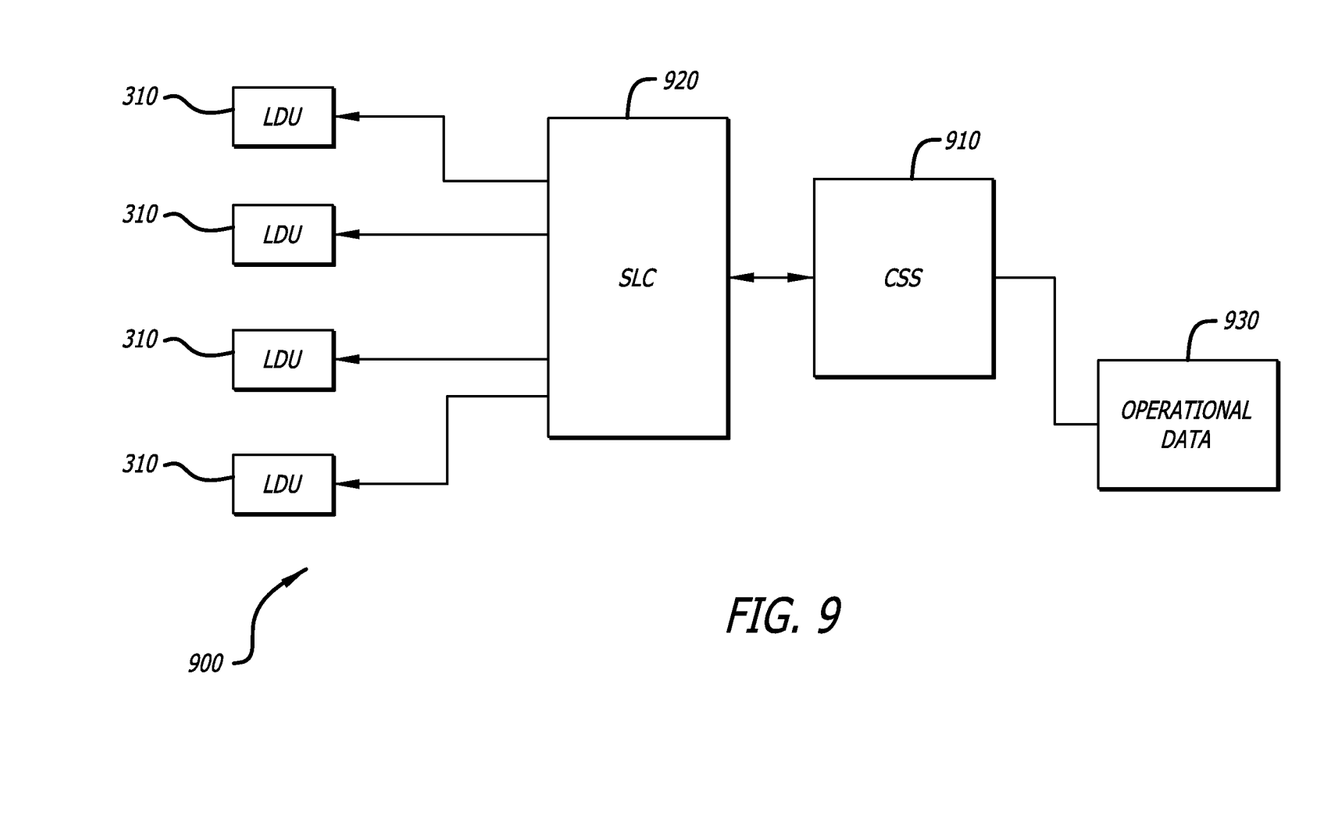
FIG. 9 is a diagram showing the disclosed system for the starry skies ceiling panel, in accordance with at least one embodiment of the present disclosure.

FIG. 9 is a diagram 900 showing the disclosed system for the starry skies ceiling panel 110, in accordance with at least one embodiment of the present disclosure. In this figure, the system is shown to comprise a cabin services system (CSS) 910 coupled to a star light controller (SLC) 920, which is coupled to a plurality of LDUs 310 of panels (refer to 110 of FIG. 2). In one or more embodiments, the CSS 910 and the SLC 920 may be located within the electronics bay of the vehicle (e.g., aircraft) 120.

During operation of the disclosed system, the CSS 910 accesses and processes operational data (e.g., vehicle operational data, such as flight data) 930 to determine the current operational phase (e.g., the current flight phase of the aircraft, such as a nighttime phase or a daytime phase) of the vehicle (refer to 120 of FIG. 2). After the CSS 910 has determined the current operational phase, the CSS 910 commands the SLC 920 to control the LDUs 310 of each of the panels 110 according to the determined current operational phase. After the LDUs 310 receive the commands from the SLC 920, the LDUs 310 individually command their different light sources (refer to 510 of FIG. 5) to activate (e.g., illuminate) or inactivate (e.g., not illuminate) according to the current operational phase. After the light sources 510 are commanded, the light sources 510 activate (e.g., illuminate) or inactivate (e.g., not illuminate) according to the current operational phase. After the light sources 510 activate (e.g., illuminate) or inactivate (e.g., not illuminate) accordingly, light (refer to 650 of FIG. 6) is illuminated through the optical fibers (refer to 330 of FIG. 5) coupled to the optical devices (refer to 620 of FIG. 6) to create the lighted scene on the panel 110.

Figure 10:
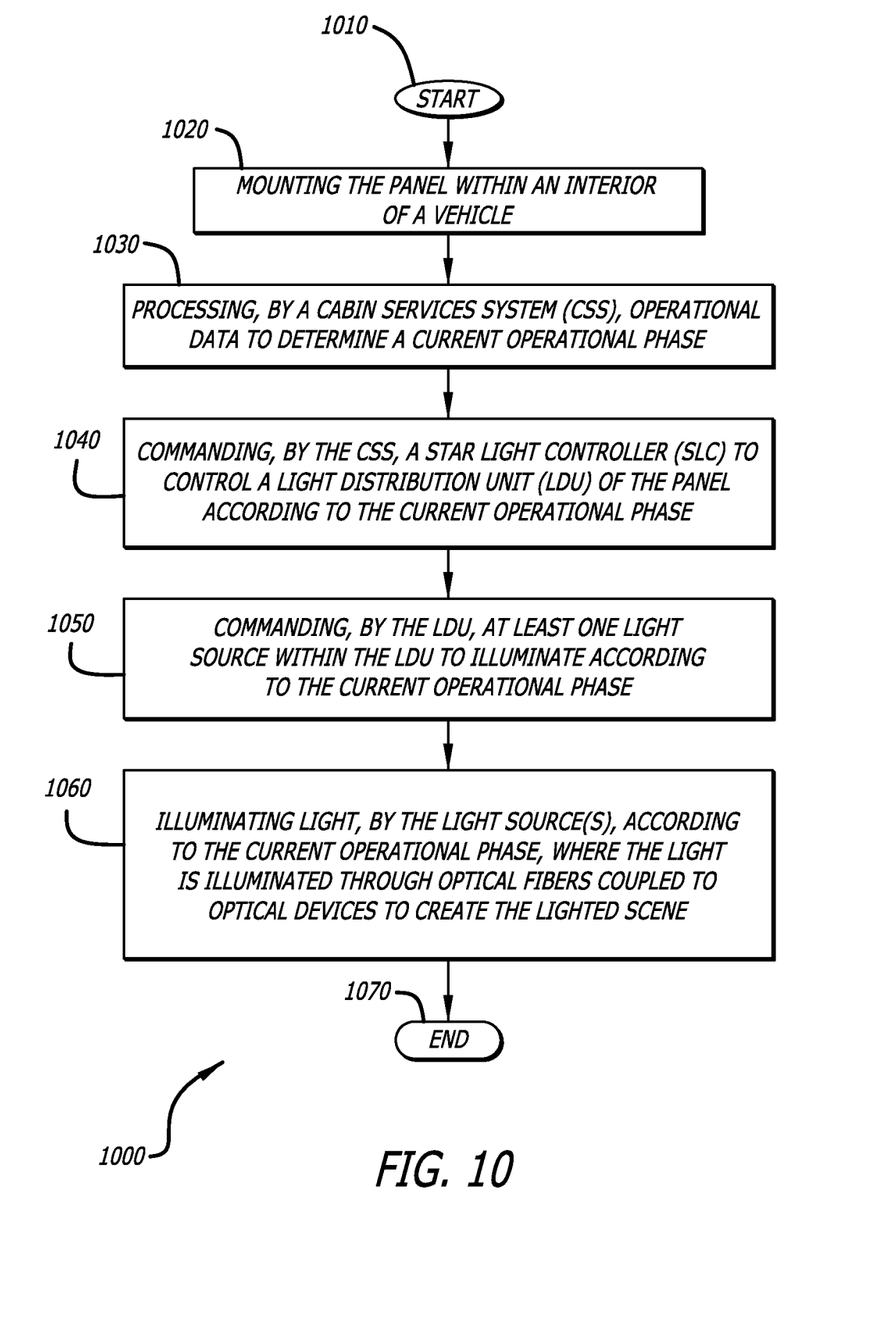
FIG. 10 is a flow chart showing an example method for operating the disclosed starry skies ceiling panel, in accordance with at least one embodiment of the present disclosure.

FIG. 10 is a flow chart showing an example method 1000 for operating the disclosed starry skies ceiling panel 110, in accordance with at least one embodiment of the present disclosure. At the start 1010 of the method 1000, the panel is mounted within an interior of a vehicle 1020. Then, a cabin services system (CSS) processes operational data (e.g., flight data) to determine a current operational phase (e.g., current flight phase) 1030. The CSS then commands a star light controller (SLC) to control a light distribution unit (LDU) of the panel according to the current operational phase 1040. Then, the LDU commands at least one light source (e.g., LED) of the LDU to illuminate according to the current operational phase 1050. The light source(s) then illuminates light according to the current operational phase, where the light is illuminated through optical fibers coupled to the optical devices to create a lighted scene 1060. Then, the method 1000 ends 1070.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. A panel for creating a lighted scene, the panel comprising:
    a substrate comprising a first surface, a second surface spaced from the first surface, and a plurality of apertures through the first and second surfaces;
    a plurality of optical devices, each comprising an optical insert and an optical lens, disposed on the first surface of the substrate, wherein each of the optical devices is disposed within one of the apertures;
    a light distribution unit (LDU) comprising a plurality of light sources, which are configured to emit light, and coupled to the first surface of the substrate; and
    a bundle of optical fibers, wherein a first end of each of the optical fibers is coupled to one of the light sources and a second end of each of the optical fibers is connected to one of the optical devices, wherein each of the optical fibers is in communication with one of the optical devices for transferring light to create the lighted scene on the second surface of the substrate.

2. The panel of claim 1, wherein the substrate is configured to be mounted to an interior of a vehicle.

3. The panel of claim 2, wherein the vehicle is one of an airborne vehicle, a terrestrial vehicle, or a marine vehicle.

4. The panel of claim 1, wherein each of the optical lenses is convex in shape.

5. The panel of claim 1, wherein each of the optical lenses allows for light to be observed from up to an eighty-five (85) degree viewing angle.

6. The panel of claim 1, wherein the light sources are light emitting diodes (LEDs).

7. The panel of claim 1, wherein each of the light sources illuminates a different illumination pattern.

8. The panel of claim 7, wherein one of the illumination patterns is a slow twinkling illumination pattern, a fast twinkling illumination pattern, a constant bright illumination pattern, or a constant dim illumination pattern.

9. The panel of claim 1, wherein each of the optical fibers is coupled to one of the light sources via a light pipe.

10. The panel of claim 1, wherein each of the light sources is individually controllable.

11. A method for operating a panel for creating a lighted scene, the method comprising:
    commanding, by a light distribution unit (LDU) of the panel, at least one light source within the LDU to illuminate according to an operational phase; and
    illuminating light, by the at least one light source, according to the operational phase,
    wherein the light is illuminated through optical fibers coupled to the at least one light source and coupled to a plurality of optical devices, each comprising an optical insert and an optical lens, to create the lighted scene.

12. The method of claim 11, wherein the method further comprises processing, by a cabin services system (CSS), operational data to determine the operational phase.

13. The method of claim 12, wherein the operational data is flight data.

14. The method of claim 11, wherein the method further comprises commanding, by a cabin services system (CSS), a star light controller (SLC) to control the LDU of the panel according to the operational phase.

15. The method of claim 11, wherein the operational phase is a flight phase.

16. The method of claim 11, wherein the method further comprises mounting the panel within an interior of a vehicle.

17. The method of claim 16, wherein the vehicle is one of an airborne vehicle, a terrestrial vehicle, or a marine vehicle.

18. The method of claim 11, wherein the at least one light source is a light emitting diode (LED).

19. The method of claim 1, wherein the at least one light source illuminates an illumination pattern.

20. The method of claim 19, wherein the illumination pattern is one of a slow twinkling illumination pattern, a fast twinkling illumination pattern, a constant bright illumination pattern, or a constant dim illumination pattern.

\* \* \* \* \*